(12) United States Patent
Schafer (10) Patent No.: US 7,942,606 B2
(45) Date of Patent: May 17, 2011

(54) GROUNDWATER CONTROL SYSTEM WITH AUTOMATIC WATER FLOW REGULATOR

(75) Inventor: Christopher E. Schafer, Adair, IA (US)

(73) Assignee: Charles J. Schafer, Panora, IA (US)

( * ) Notice: Subject to any disclaimer, the term of this patent is extended or adjusted under 35 U.S.C. 154(b) by 161 days.

(21) Appl. No.: 12/387,185

(22) Filed: Apr. 29, 2009

(65) Prior Publication Data

US 2010/0276015 A1 Nov. 4, 2010

(51) Int. Cl.
*E02B 11/00* (2006.01)

(52) U.S. Cl. .......................................... 405/39; 405/96

(58) Field of Classification Search .................. 405/36, 405/37, 39, 40, 41, 96, 97
See application file for complete search history.

(56) References Cited

U.S. PATENT DOCUMENTS

| | | | | |
|---|---|---|---|---|
| 2,362,747 A | * | 11/1944 | Duke | 405/41 |
| 2,896,904 A | * | 7/1959 | Northup | 405/41 |
| 3,951,163 A | * | 4/1976 | Rodieck | 405/40 |
| 4,621,945 A | * | 11/1986 | Schafer et al. | 405/39 |
| 5,002,428 A | * | 3/1991 | Shettel | 405/39 |
| 6,132,139 A | * | 10/2000 | Hashimoto et al. | 405/41 |
| 6,715,508 B2 | | 4/2004 | Schafer et al. | |
| 6,786,234 B2 | | 9/2004 | Schafer et al. | |
| 2005/0025573 A1 | * | 2/2005 | Waldman et al. | 405/41 |

FOREIGN PATENT DOCUMENTS

DE   3937685 A1 * 5/1991

* cited by examiner

*Primary Examiner* — Frederick L Lagman (74) *Attorney, Agent, or Firm* — G. Brian Pingel; Camille L. Urban (57) ABSTRACT

An automatic water flow regulator apparatus and a system for controlling and regulating the level of groundwater in an agricultural field. An automatic flow regulator adapted for use in a buried tile line that responds to conditions upstream and downstream along the line in order to regulate flow. A system having a tile line buried in a field for draining water therefrom, a preferably manually operated terminal control stand positioned at the discharge end of the system, and one or more automatic water flow regulators along the line for controlling the flow of water therethrough in conjunction with said terminal control stand.

13 Claims, 7 Drawing Sheets

FIG. 1

PRIOR ART

GROUNDWATER CONTROL SYSTEM WITH AUTOMATIC WATER FLOW REGULATOR

CROSS-REFERENCE TO RELATED APPLICATIONS

None

BACKGROUND OF THE INVENTION

1. Field of the Invention

The present invention relates in general to regulating the level of groundwater in the fields of an agricultural operation and, more particularly, wherein the level of the groundwater in the field is automatically regulated according to contemporaneous and local groundwater levels as well as manually actuated downstream control mechanisms.

2. Description of the Prior Art

It is known in the art to use a variety of machines and apparatuses to increase or decrease moisture in the soil used for agrarian purposes. Some of these machines include the use of aquifers, irrigation ditches and canals, use of overhead sprinkler irrigation, terracing for directing the flow of water while maintaining top soil and some moisture in the soil on a hill, and the laying of underground tile lines into which water will drain and flow away from the field.

Tile lines, effective for routing excess water from the soil, have heretofore typically served that singular purpose. Unfortunately, when moisture levels in the season result in a need for more water in the soil, the tile lines typically continue to drain without means to control or adjust the flow. In this manner, efficient water removal by the lines can be detrimental to the crop either by depriving the plants of moisture or by allowing nitrates, phosphates and other nutrients used by plants to flow out of the soil before sufficient time has passed to allow them to break down naturally. This means that ponds and streams are often polluted by these nutrients.

As an improvement over uncontrolled tile lines, drainage systems have been developed that include the use of flow control regulators in the lines in such a way as to manage and regulate the moisture level in the soil. The management is typically based upon seasonal needs and is provided via water level control structures or groundwater control systems. Two types of groundwater control systems are described in U.S. Pat. Nos. 6,715,508 to Schafer et al., issued Apr. 6, 2004, and 6,786, 234 to Schafer et al., issued Sep. 7, 2004.

Although water drainage systems that include timer control regulators are a vast improvement over uncontrolled systems, they operate in essentially the same manner regardless of the type of weather that has occurred and the amount of groundwater in the soil.

SUMMARY OF THE INVENTION

The present invention is referred to as a Watergate and provides an apparatus and a system for controlling and regulating the level of groundwater in an agricultural field that involves the use of a buried tile line in said field to drain water therefrom, a preferably manually or automatically operated control stand, typically positioned at or near the discharge end of the system, and one or more novel automatic water flow regulators located in the tile line for controlling the flow of water therethrough in conjunction with said control stand.

In a preferred embodiment of the apparatus and system of the present invention, the automatic water flow regulator is opened or closed based on the amount of water in the tile line proximate said regulator. The present invention is designed to provide a groundwater control system that is actuated in response to the volume of water present in the system, provides increased water and nutrient availability to increase yield, disrupts the preferential flow of chemicals and fertilizers and minimizes outflow.

It is also advantageous to have regulators that are fully automatic and do not require active management, and regulators that are completely buried in the field, thereby eliminating the problem of having to farm around such apparatuses or those control or access portions of such devices that emerge above the surface of a field. It is also an object of the present invention to provide a system capable of providing infinitely variable water table levels.

The foregoing and other advantages of the present invention will appear from the following description. In the description, reference is made to the accompanying drawings, which form a part hereof, and in which there is shown by illustration and not of limitation a specific system and method in which the invention may be embodied. Such embodiments do not represent the full scope of the invention, but rather the invention may be employed in a variety of other embodiments and reference is made to the claims herein for interpreting the breadth of the invention.

DETAILED DESCRIPTION OF THE PREFERRED EMBODIMENTS

The present invention is adapted to provide an apparatus and a system for regulating the level of groundwater in an agricultural field according to the amount of water present in the system. Consequently, the system and method of the present invention may be advantageously employed to reduce, maintain or accumulate the amount of groundwater according to simultaneous needs for the planting and harvesting of crops in the field as well as regulating the flow of water from a field when it is contaminated with impurities. For example, during the growing months it is desirable to keep the water table high in the soil so that nutrients, phosphates and nitrates will not be lost through unnecessary or excessive drainage. The present invention also allows for the addition of water to the field by sub-irrigation. Additional water and nutrients may help improve the effectiveness of riparian vegetation buffers by enhancing plant density and growth.

In contrast to maintaining a high water table during the growing months, the water table should be significantly lowered prior to harvest to allow access to the field and to minimize compaction of the soil by large harvesting equipment. This is also true for the time period prior to and during planting to allow the soil to warm and encourage root growth and, again, to allow access to the field.

During times of heavy rainfall, the present invention can also be employed to reduce the amount of drainage from the field to prevent nutrients, phosphates, nitrates and other constituents i.e. pesticides and herbicides, from being carried away by the drainage of excess water from the field. Reduction of downstream flooding and reduction of the volume of water flow from the field extends the time frame over which subsurface waters are released into wetlands to allow time for the biological process that occurs in a wetland to more fully treat or purify the water passing through said wetland. Accordingly, the present invention is adapted to automatically respond to local groundwater conditions such as the water table level of the field or the amount of impurities in the water table and can take seasonal needs into account in doing so in order to automatically manage water drainage from the field.

Figure 1:
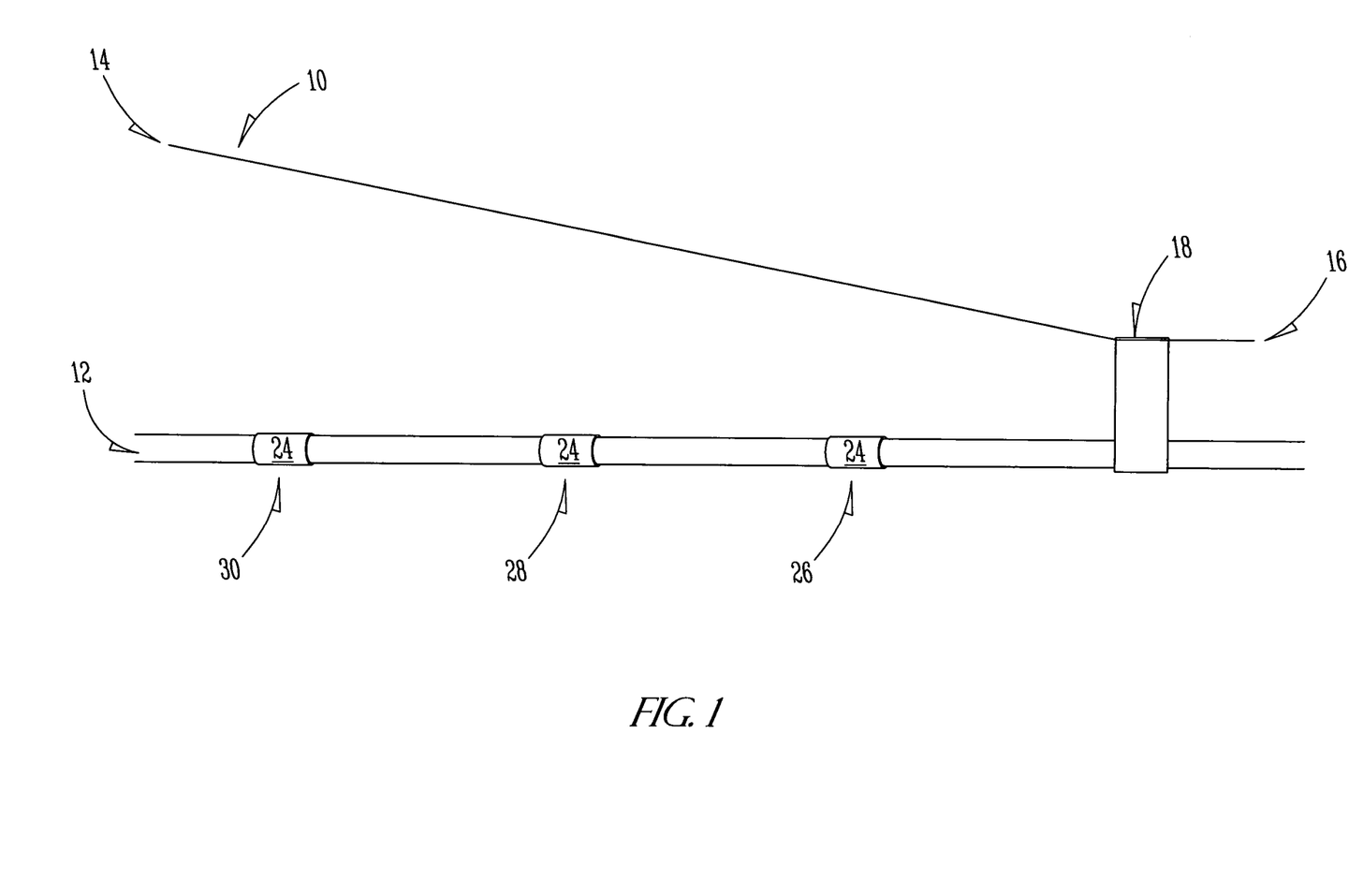
FIG. 1 is a diagrammatical view of an agricultural field having various components of a groundwater control apparatus and system of the present invention that are located in the field.

Referring now to the drawings and with reference first to FIG. 1, a diagram of an agricultural field is shown generally at 10. Although only one field 10 is illustrated in FIG. 1, it is contemplated that the system and method of the present invention can be readily employed for providing water drainage control of numerous different fields. While the illustrative embodiment is depicted to address drainage of groundwater in an agricultural field, persons skilled in the art will appreciate that the apparatus and system may be used to regulate the flow of any fluid in any suitable environment or fluid system.

Figure 2:
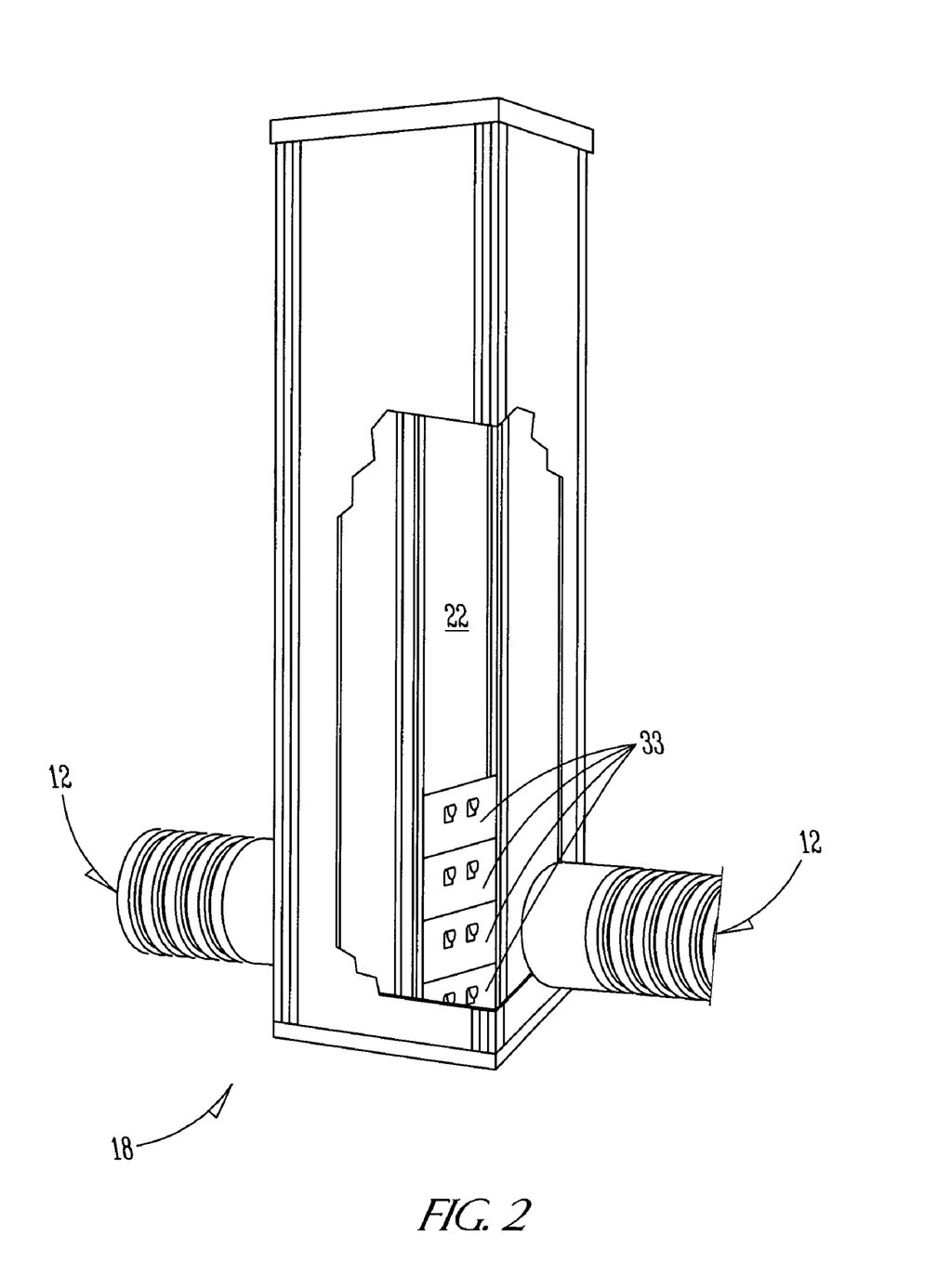
FIG. 2 is a perspective, partial cutaway view of a conventional control stand.

With respect to FIG. 1, agricultural field 10 has a buried groundwater drainage tile line 12 that runs down grade from highest point 14 of field 10 and terminates at its lowest point 16. Line 12 need not be inclined at the same or similar slope as field 10 so long it generally tracks the grade of field 10 and permits gravity drainage therefrom. That section of line 12 proximate lowest point 16 of field 10 is characterized by a conventional control stand 18, which may be one of any number of types known in the art. As shown in FIG. 2, control stand 18 is preferably manually operable (but may also be automatic) such that one or more physical barriers 20 may be cumulatively applied to the interior 22 of control stand 18—e.g., by sliding them in from above—to restrict water flow out of line 12. By way of example only, physical barriers 20 may be planks or stop logs. Thus, the control stand 18 is capable of infinite variability, has two way telemetry, can monitor, measure, and record rainfall, water levels and water flows to help quantify the reduction of outflow of a managed drainage system compared to the outflow of an unmanaged drainage system to facilitate water quality trading and to determine eco services benefits. One such control stand is Agri Drain Corporation's Inline Water Level Control Structure™ (AGRI DRAIN CORPORATION; Adair, Iowa).

Turning back to FIG. 1, line 12 is further characterized by at least one automatic water flow regulator 24 in fluid connection therewith. Ordinarily, in order to achieve optimal regulation, a plurality of automatic water flow regulators 24 will be provided along the length of tile line 12 such that one regulator 24 is provided for every foot or so of vertical incline of field 10. For example, if the change in elevation between lowest point 16 of field 10 and highest point 14 of field 10 is roughly three (3) feet, a first regulator 26 is provided along line 12 beneath that area of field 10 that is approximately one foot in elevation above lowest point 16, a second regulator 28 is provided further along line 12 beneath that area of field 10 that is approximately two feet in elevation above lowest point 16, and a third regulator 30 is provided further along line 12 beneath that area of field 10 that is approximately three feet in elevation above lowest point 16.

It will be appreciated that this one-foot vertical spacing convention of regulators 24 may vary to accommodate surface or sub-surface features or obstacles, and that the stated spacing is for exemplary purposes only. In some instances, it may be desirable to locate regulator 24 slightly upstream or downstream of a branch line (not shown) attached to tile line 12 at a point at or near the one-foot vertical increment of field 10. Deviating from the one-foot vertical spacing convention may result in a watertable directly above the subject regulator 24 that is slightly higher or lower than intended. Any such variance can be corrected by locating the next upstream regulator 24 at an elevation that relates back to the one-foot vertical spacing relative to the lowest point 16 of field 10. In other words, variances in individual vertical spacing may be corrected by having the average intervals of each regulator 24 close or equal to one foot.

The third regulator 30 may, but need not, be located directly beneath highest point 14. Each regulator 24 services a corresponding surface area of field 10, and that portion of line 12 generally upstream therefrom. For example, it will be appreciated by persons skilled in the art that the surface area of field 10 serviced by third regulator 30, as shown in FIG. 1, will include highest point 14.

Figure 3:
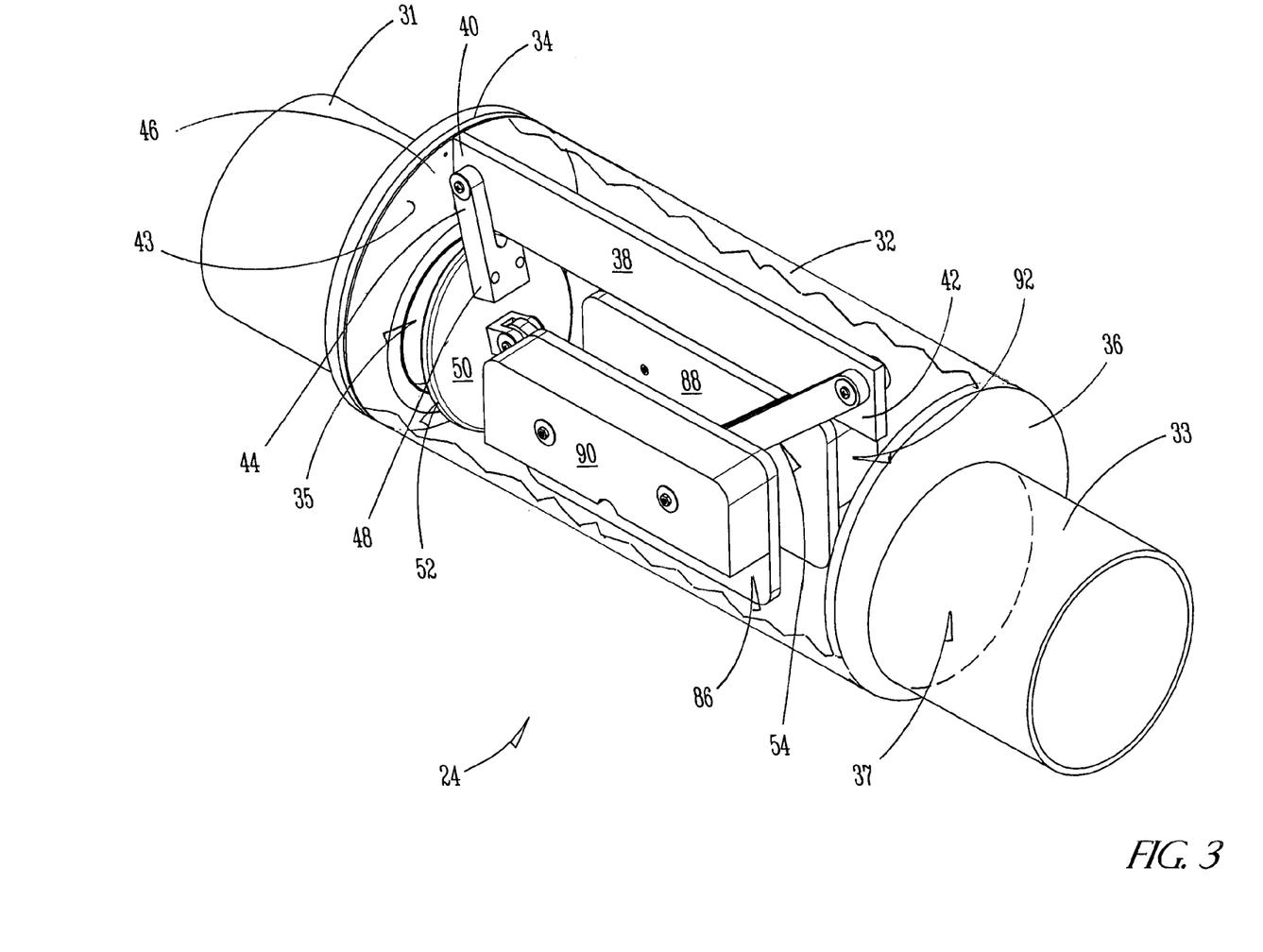
FIG. 3 is a perspective, partial cutaway view of a preferred embodiment of a groundwater control apparatus of the present invention in an opened position.

Turning to FIG. 3, each automatic water flow regulator 24 comprises an elongate, housing 32, an upstream end 34, a downstream end 36 and there are connecting portions 31 and 33 extending outwardly from the upstream and downstream ends 34, 36 respectively that are both cylindrically shaped and sized to receive a portion of the tile line 12 (see FIG. 1). Housing 32 is preferably cylindrically shaped with a diameter of approximately 12 inches, but may be any shape or diameter. Preferably, the upper housing portion has at least one air vent (not shown) to prevent air compression within housing 32 during operation of regulator 24. Each of upstream end 34 and downstream end 36 defines an aperture 35, 37, respectively, adapted to be in fluid connection with line 12 via connecting means that are well known in the art. Water flow through the line 12 is controlled by the regulator 24 by means of a water actuated float assembly that acts to open and close regulator 24 in response to the amount of water in the field 10 as will now be described.

Disposed within housing 32 is a longitudinal frame rail 38 that serves as an upper attachment means having an upstream end 40 and a downstream end 42, wherein "upstream" and "downstream" refer to the relative orientation of rail 38 within housing 32. Rail 38 is secured at its upstream end 40 to the inside face 43 of the housing upstream end 34.

Also disposed within housing 32 is a hinge 44 having a first end 46 pivotably attached to one or both sides of upstream end 40 of rail 38, and a second end 48 securely attached near the upper edge of a closure 50. Alternatively, and perhaps depending on the construction of hinge 44, first end 46 of hinge 44 may be attached to upstream end 34 of housing 32 proximate, and on one or both sides of, rail 38.

The closure 50 comprises a generally flat surface that—in a closed condition—is held against the housing upstream end face 43 to fully cover aperture 35 at the interface between upstream end 34 of housing 32 and connecting portion 31. The perimeter of closure 50 may be fitted with a sealing member 52 such as a gasket to form a better seal with upstream end 34 of housing 32. Alternatively, rather than using the sealing member 52, it has been found to be preferable to employ circular rib structures on the closure 50 and the upstream end face 43 to prevent the closure 50 from vibrating or chattering when it is in a partially opened condition as will now be described.

Figures 9, 10:
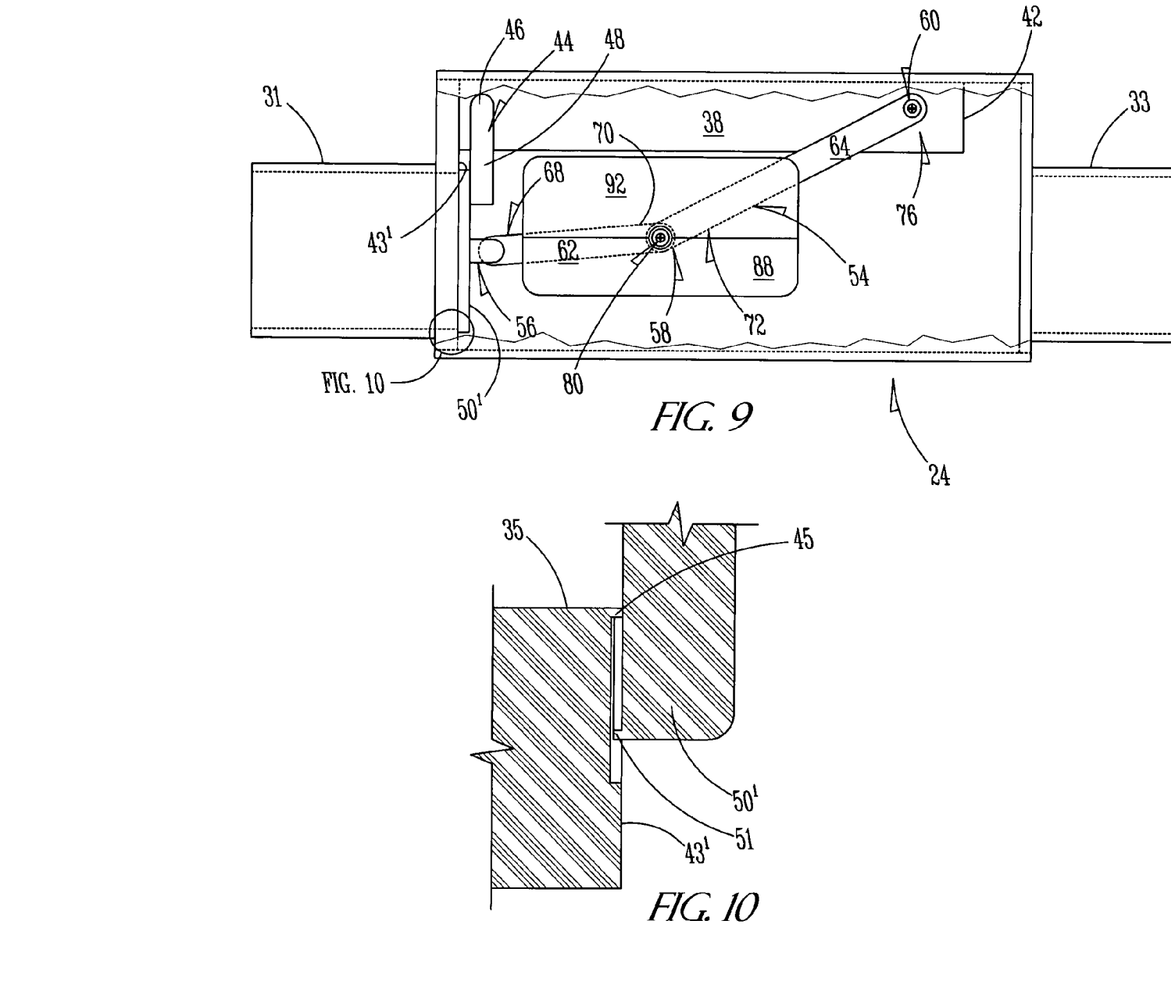
FIG. 9 is a cutaway view similar to that of FIG. 6, but modified to include rib structures.
FIG. 10 is an enlarged partial view of a selected part of the control apparatus as indicated in FIG. 9.

Referring to FIGS. 9 and 10, the regulator 24 has a modified closure 50' and an upstream end face 43' to provide circular rib structures thereon. Such rib structures are relatively shallow as indicated in FIG. 10 showing the closure 50' having an upstream facing rib 51 disposed about the circumference of the closure 50' and the upstream end face 43' having a downstream facing rib 45 disposed about the periphery of the aperture 35. The closure rib 51 is approximately 0.035" high and extends toward the end face 43' to restrict water flow and equalize water pressure when the regulator 24 is partially open. The end face rib 45 is approximately 0.045" high and provides a circular contact surface between the closure 50' and the end face 43' to establish a passive seal therebetween.

Water tightness of the seal between closure 50 and aperture 35 may vary, but it is anticipated that the seal will not be fully watertight, particularly when line 12 upstream from regulator 24 is under approximately one foot of head pressure or more. Persons skilled in the art will appreciate that one vertical foot of water produces approximately 0.433 pounds of pressure per square inch on the closure 50. When exposed to increased head pressures, closure 50 will open at least partially. Even under diminished head pressure, flow through aperture 35 and into regulator 24 at a rate of two (2) gallons per minute, more or less, may be expected.

Figure 5:
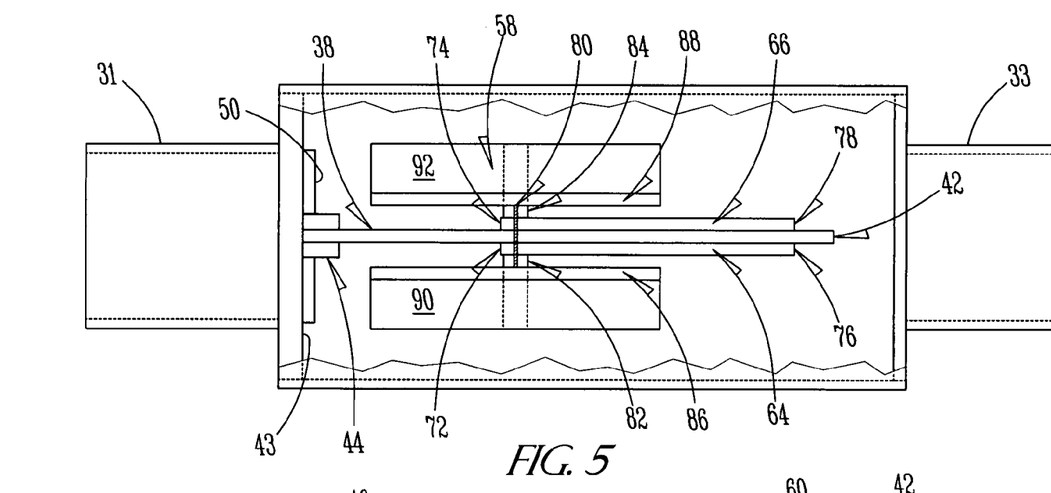
FIG. 5 is a top, partial cutaway view of the groundwater control apparatus of FIG. 3 in a closed position.
Figure 6:
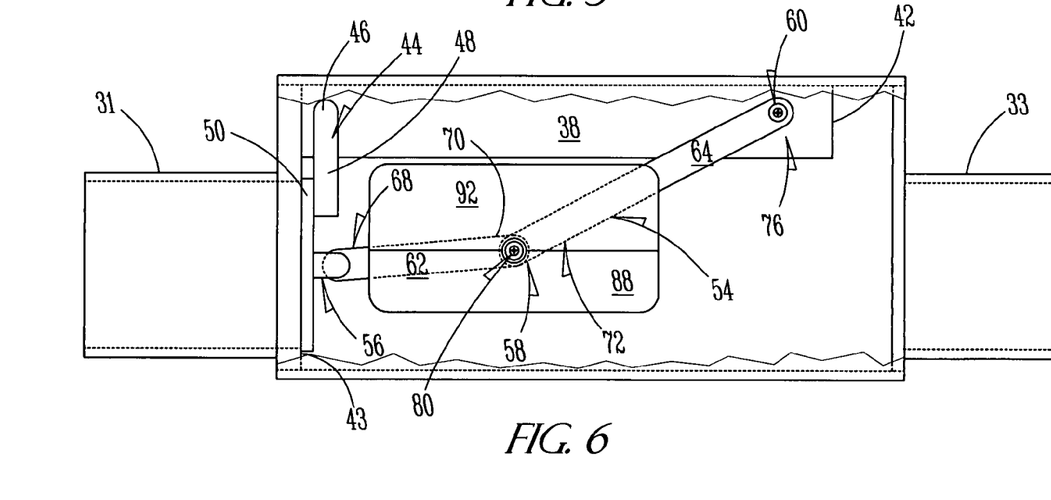
FIG. 6 is a side, partial cutaway view of the groundwater control apparatus of FIG. 3 in a closed position.
Figure 7:
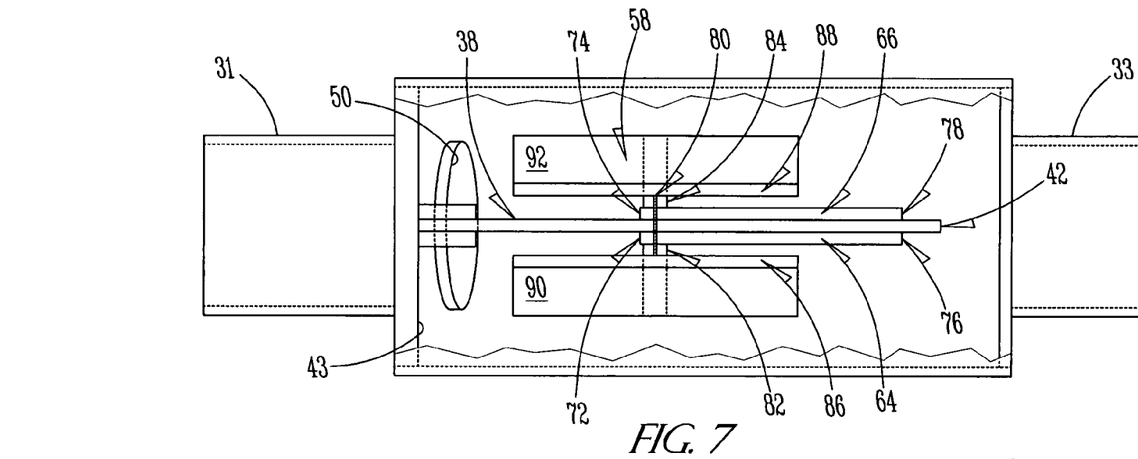
FIG. 7 is a top, partial cutaway view of the groundwater control apparatus of FIG. 3 in an opened position.
Figure 8:
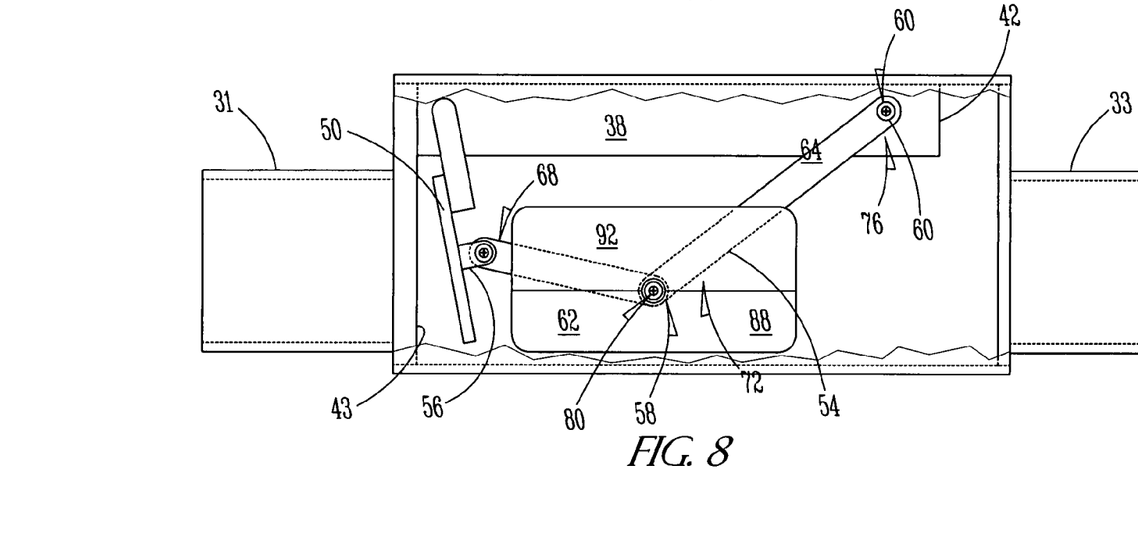
FIG. 8 is a side, partial cutaway view of the groundwater control apparatus of FIG. 3 in an opened position.

Further disposed within housing 32, as shown best in FIGS. 6 and 8, is an articulated, elongate lever arm 54 having a first end 56 proximate closure 50, a roughly centrally located joint 58, and a second end 60 proximate downstream end 42 of rail 38. In a preferred embodiment illustrated in FIGS. 5 and 6, that portion of lever arm 54 between first end 56 and joint 58 is a unitary, rigid member 62, while that portion of lever arm 54 between joint 58 and second end 60 comprises two symmetric and parallel rigid members 64, 66. Unitary member 62 comprises an upstream end 68 and a downstream end 70; symmetric members 64, 66 each comprise upstream ends 72, 74 and downstream ends 76, 78, respectively. "Upstream" and "downstream" in this context again refer to the relative orientation of lever arm 54 within housing 32.

Upstream end 68 of unitary member 62 is pivotably and roughly centrally attached to closure 50. Downstream end 70 of unitary member 62 is pivotably attached about joint 58. Upstream ends 72, 74 of members 64, 66 are also pivotably attached about joint 58. Downstream ends 76, 78 of members 64, 66 are pivotably attached to opposite sides of downstream end 42 of rail 38.

Housing 32, rail 38, closure 50 and articulated lever arm 54 may be made of any suitable rigid material, but are preferably made of rigid poly vinyl chloride (PVC) or a similar material.

Turning to FIGS. 5-8, joint 58 is depicted. In a preferred embodiment, joint 58 comprises a pivot pin 80 that passes through the downstream end 70 of unitary member 62, and the upstream ends 72, 74 of members 64, 66. Pivot pin 80 also passes through a pair of spacer bushings 82, 84 on either side of members 64, 66 and through a pair of parallel, symmetric vertical supports 86, 88. Vertical supports 86, 88 are preferably rectangular in shape and rigid in construction.

Figure 4:
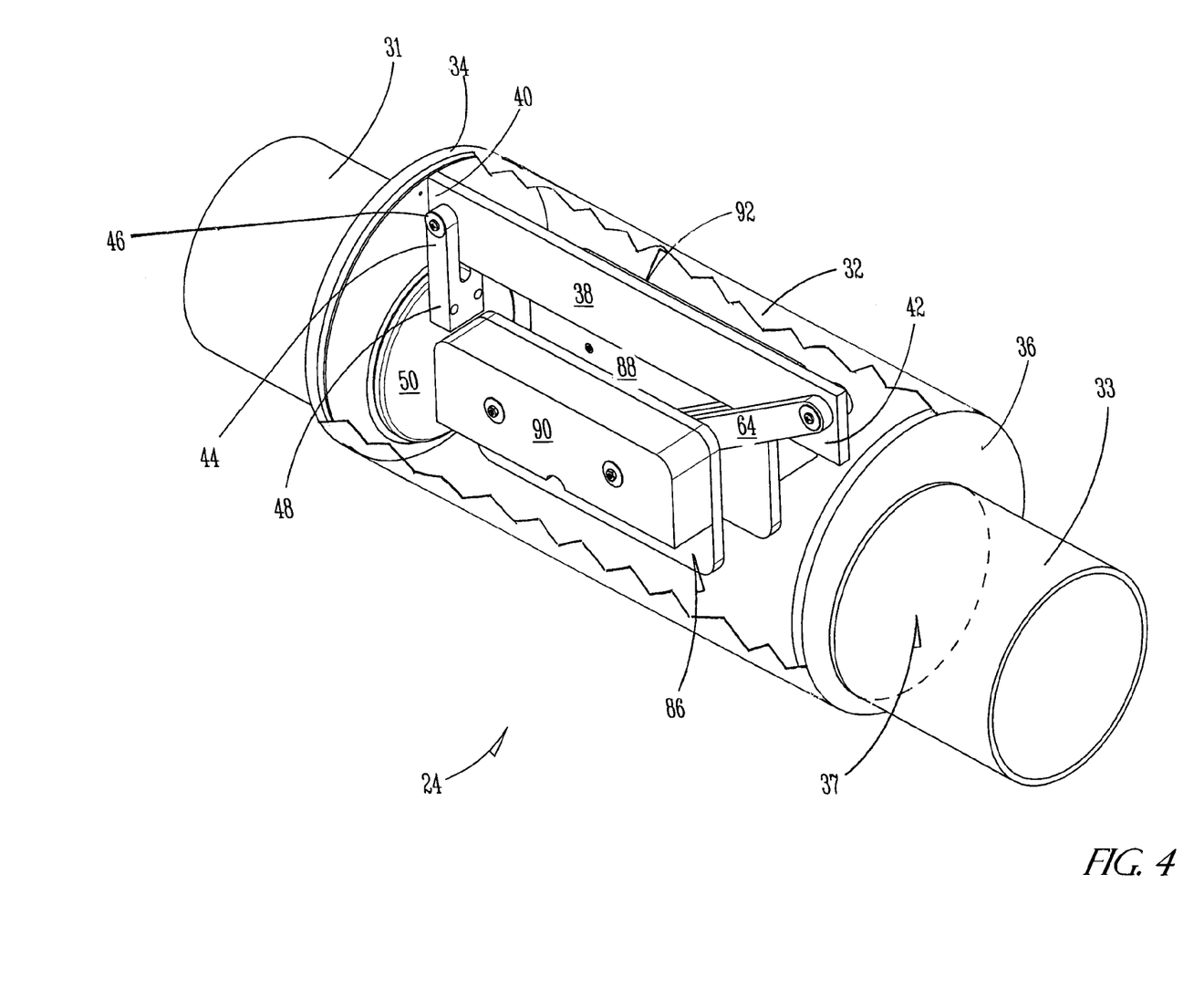
FIG. 4 is a perspective, partial cutaway view of the groundwater control apparatus of FIG. 3 in a closed position.

As shown in FIGS. 3-5, attached to vertical supports 86, 88 are float members 90, 92, respectively. Float members 90, 92 are blocks that are generally smaller than, and do not extend beyond the outer perimeter of, vertical supports 86, 88. Float members 90, 92 are preferably constructed of a lightweight, resilient and buoyant material such as foam or other polystyrene product.

It will be appreciated by those skilled in the art that automatic water flow regulator 24 functions substantially as follows. In a state of rest, illustrated in FIGS. 3 and 8—e.g., where no buoyant forces are exerted upward on float members 90, 92, such as where there is little or no water downstream of regulator 24 in line 12, closure 50 does not form a seal over aperture 35 and regulator 24 is in the "open" position. Hence, water in tile line 12 upstream of regulator 24 will flow uninhibited through upstream end 34, through housing 32, and out through downstream end 36. This open position is also achieved when the head pressure upstream of regulator 24 exceeds approximately one foot, as described above.

As housing 32 fills with water, such as where the amount of water in line 12 downstream from regulator 24 is increased, buoyant forces will be exerted upward on float member 90, 92, thereby causing joint 58 to pivot upward about pivot pin 80. The action of joint 58 upon closure 50 is accomplished via unitary member 62 of articulated lever arm 54. Upstream end 68 of unitary member 62 pivots about its point of attachment with closure 50, thereby forcing closure 50 against upstream end 34 about hinge 44. Parallel, symmetric members 64, 66 of articulated lever arm 54 pivot about rail 38 in response to the upward action of joint 58. This results in regulator 24 being in a "closed" position, illustrated in FIGS. 4-6. In quantitative terms, regulator 24 will close when the vertical depth of water within housing 32 meets or exceeds approximately eight to nine (8-9) inches.

Referring back to FIG. 1, a system of flow regulation along line 12 incorporates at least one regulator 24 with control stand 18. It will be understood by those skilled in the art that the flow of water along line 12 is restricted by the installation of additional barriers 20 to the interior chamber 22 of control stand 18 as indicated in FIG. 2. This results in decreased throughput along line 12. Upstream from control stand 18 along line 12 is regulator 24. When regulator 24 is in the closed position, it may be inferred that the amount of water downstream has resulted in water collecting in regulator 24. This would be advantageous, for example, during a period of heavy rainfall. When regulators 24 are closed, they temporarily block water flow through line 12 in order to prevent excess water drainage from the field following the application of fertilizers or pesticides to the field to prevent the runoff thereof.

Thus, the present invention provides a novel and unique means for regulating the level of groundwater in an agricultural field according to selected criteria. Although the control system and method of the present invention has been described with respect to a preferred embodiment, it should be understood that such embodiment may be altered without avoiding the true spirit and scope of the present invention.

What is claimed is:
1. An automatic fluid flow regulator comprising:
a housing having an upstream end and a downstream end, said upstream and downstream ends each further defining an aperture adapted to be in fluid connection with a fluid conduit;
a longitudinal frame rail disposed within said housing, said rail having an upstream rail end and a downstream rail end;
a hinged closure disposed within said housing proximate said upstream rail end of said rail and adapted to fit over said aperture in said upstream end of said housing;

an articulated lever arm disposed within said housing and further comprising an upstream lever, a roughly centrally positioned joint, and a downstream lever, wherein said upstream lever is pivotably attached distal from said joint to said closure and wherein said downstream lever is pivotably attached distal from said joint to said downstream rail end of said rail, and wherein said upstream and downstream levers pivot about said joint;

a support pivotably attached to said joint; and a float member attached to said support.

2. The automatic fluid flow regulator of claim 1 wherein said closure is hingedly attached to said rail and the upstream end of said housing.

3. The automatic fluid flow regulator of claim 1 wherein said downstream lever of said articulated lever arm comprises two symmetric and parallel members, and wherein said upstream lever of said articulated lever arm proximate said joint and said downstream rail end of said rail are disposed between said symmetric and parallel members.

4. The automatic fluid flow regulator of claim 1 further comprising a plurality of float members.

5. The automatic fluid flow regulator of claim 1 wherein said closure substantially covers said aperture in said upstream end of said housing when the vertical depth of fluid within said housing exceeds approximately eight inches.

6. The automatic fluid flow regulator of claim 1 wherein said closure does not substantially cover said aperture in said upstream end of said housing when the fluid head pressure in said fluid conduit upstream of said regulator exceeds approximately one foot.

7. The automatic fluid flow regulator of claim 1 wherein said closure includes a generally flat surface and said housing upstream end aperture has a circular rib disposed about the periphery of said aperture to engage the flat surface of said closure and provide a passive seal therebetween.

8. The automatic fluid flow regulator of claim 7 wherein said closure has a circumference with a circular rib to restrict water flow and equalize water pressure when said regulator is partially open.

9. A groundwater control system for an agricultural field to regulate the level of groundwater in said field according to selected criteria, said system comprising:

a buried field drainage tile line extending underground in said field to serve to drain water therefrom, said tile line terminating in a discharge end;

an automatic fluid flow regulator along said tile line, wherein said regulator comprises an elongate housing having an upstream end and a downstream end, said upstream and downstream ends each further defining an aperture adapted to be in fluid connection with said tile line;

a longitudinal frame rail disposed within said housing, said rail having an upstream rail end and a downstream rail end;

a hinged closure disposed within said housing proximate said upstream rail end of said rail and adapted to fit over said aperture in said upstream end of said housing;

an articulated lever arm disposed within said housing and further comprising an upstream lever, a roughly centrally positioned joint, and a downstream lever, wherein said upstream lever is pivotably attached distal from said joint to said closure and wherein said downstream lever is pivotably attached distal from said joint to said downstream rail end of said rail, and wherein said upstream and downstream levers pivot about said joint;

said joint further comprising a pivot pin;

a support pivotably attached to said pivot pin;

a float member attached to said support; and a control stand located at the discharge end of said tile line.

10. The groundwater control system of claim 9 further comprising a plurality of said automatic fluid flow regulators along said tile line and wherein said regulators operate independently.

11. The groundwater control system of claim 10 wherein said automatic fluid flow regulators are provided substantially at the interval of one per each vertical foot of elevation of said tile line between its highest and lowest points.

12. An automatic fluid flow regulator comprising:

a housing having an upstream end and a downstream end, said upstream and downstream ends each further defining an aperture adapted to be in fluid connection with a fluid conduit;

an attachment means disposed within an upper portion said housing;

a closure disposed within said housing proximate said upstream end of said housing and adapted to fit over said aperture in said upstream end of said housing;

an articulated lever arm disposed within said housing and further comprising an upstream lever, a roughly centrally positioned joint, and a downstream lever, wherein said upstream lever is pivotably attached distal from said joint to said closure and wherein said downstream lever is pivotably attached distal from said joint to said attachment means, and wherein said upstream and downstream levers pivot about said joint;

a support pivotably attached to said joint; and a float member attached to said support.

13. The automatic fluid flow regulator of claim 12 wherein said closure is hingedly attached to said attachment means and the upstream end of said housing.

* * * * *